Figure 1:
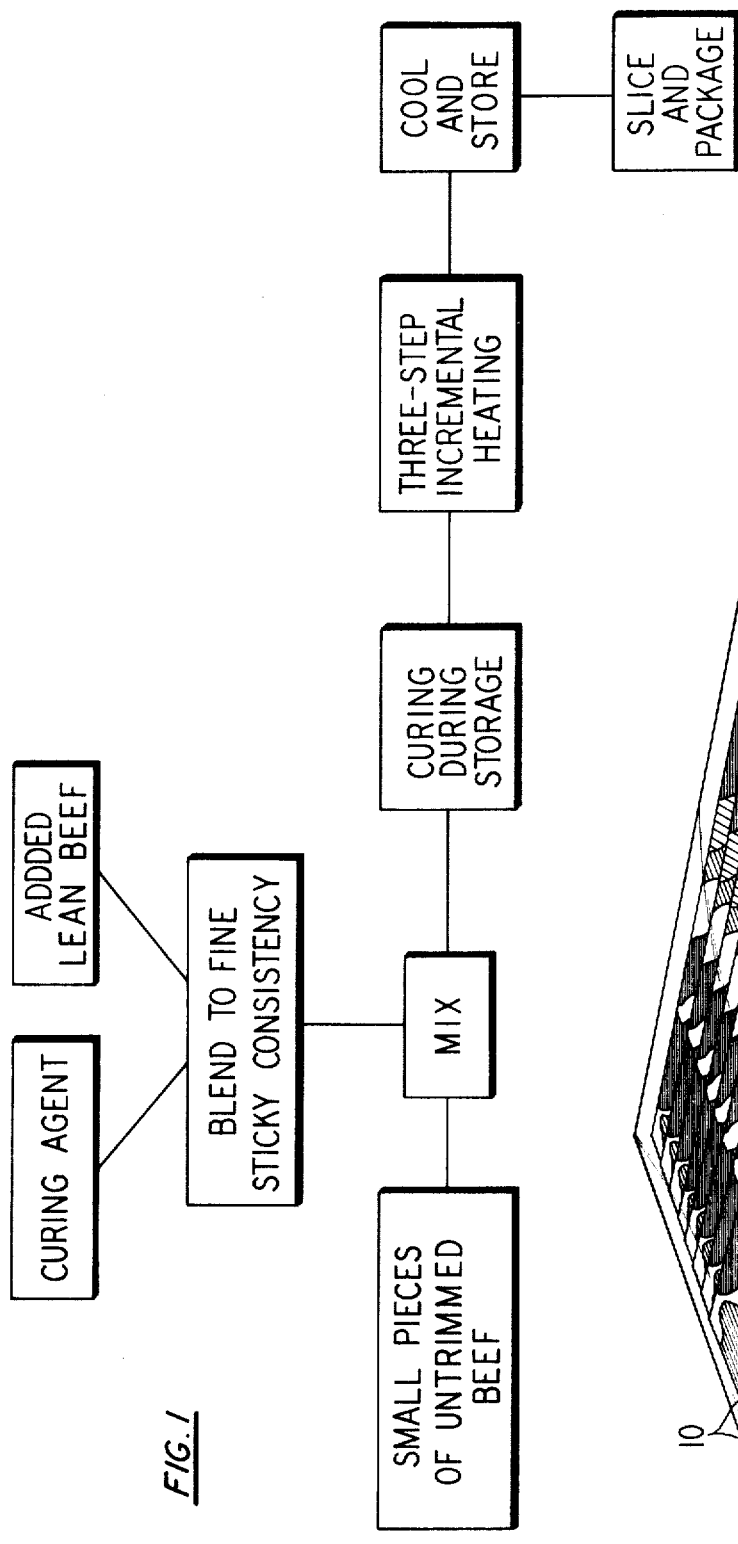

United States Patent [19]
Keszler

[11] 3,890,451
[45] June 17, 1975

[54] PROCESS OF MAKING A BACON-LIKE MEAT PRODUCT OF REDUCED FAT CONTENT

[76] Inventor: Julius L. Keszler, Boston Post Rd., Westbrook, Conn.

[22] Filed: Apr. 11, 1973

[21] Appl. No.: 350,142

[52] U.S. Cl. ............... 426/264; 426/272; 426/212; 426/382; 426/513
[51] Int. Cl. .............................................. A23l 1/31
[58] Field of Search ............ 426/92, 149, 212, 272, 426/274, 382, 513

[56] References Cited
UNITED STATES PATENTS
3,432,311    3/1969    Gruner............................ 426/212 X Primary Examiner—Raymond N. Jones
Assistant Examiner—R. A. Yoncoskie
Attorney, Agent, or Firm—Prutzman, Hayes, Kalb & Chilton

[57] ABSTRACT

A bacon-like meat product of reduced fat content is produced from a mixture of small untrimmed meat pieces integrally unified by a binder comprised of a curing agent and ground lean meat particles blended into and absorbed within the meat pieces. The composite product has a texture color and general appearance similar to primal meat cuts and is characterized by an integrated boundary between abutting pieces of meat as well as between meat anf fat areas yet the binder is not visably noticeable in the finished product.

7 Claims, 2 Drawing Figures 3,890,451

PROCESS OF MAKING A BACON-LIKE MEAT PRODUCT OF REDUCED FAT CONTENT

BACKGROUND AND SUMMARY OF THE INVENTION

The present invention relates generally to a new and improved meat product and process for its preparation. More particularly, it relates to a new and improved meat product of controlled lean meat content that preferably takes the form of and may be a substitute for bacon or similar sliced meat products.

As is well known, slabs of cured and/or smoked bacon cut from the carcass of a pig generally contain an inordinately high fat content. The bacon which is conventionally cut into oblong blocks and subsequently sliced into thin strips is usually fried, broiled or grilled and consumed despite its high fat content. Of course, as can be appreciated, the lean meat content of the bacon is subject to little or no control and is dependent on the natural condition of the animal. Accordingly, it is an object of the present invention to provide a new and improved meat product that conveniently takes the form of bacon and exhibits many of its characteristics yet can be produced in a far more economical manner with a substantially increased lean meat content, and, in fact, in such a manner as to completely control the lean meat content of the resultant bacon-like product.

As is also known, certain processed meat products such as canned hams and the like are produced from large pieces or chunks of lean meat that have been boned and compacted to a desired size. Additionally, integrated beef and pork products have been similarly produced from large chunks of beef by forming a creamy exudate on the surface of the meat, preferably while the meat is frozen, and subsequently compacting the meat into the desired form and size. The creamy exudate functions primarily as a means of promoting adhesion between the meat chunks during the compacting operation.

In my U.S. Pat. No. 3,663,233 there is also disclosed another method of packaging and tenderizing large chunks of lean meat. The disclosure therein including the discussion of prior art techniques is incorporated herein by reference. In particular, reference is made to the prior curing techniques that use either smoking, dry curing agents and a prolonged curing period arterially injection of a brine solution or immersion of the meat in the curing solution. In this connection, it is another object of the present invention to provide a product of the type described that obviates the need for smoked and other curing procedures prior to the preparatory steps of the process but can employ fresh cuts of meat and produce the bacon-like product in a more rapid and economical manner.

Still another object of the present invention is to provide a new and improved integrated meat product comprised of small pieces of whole meat including fat in an uncooked condition but integrally united or bonded into a solid mass or body of meat by means of a binder that is not visably noticeable in the end product due to its finely dispersed nature through and among the small meat pieces. The binder blends and knits the individual pieces so as to impart to the meat product the integrity necessary to permit slicing into thin integral strips which upon frying, boiling or grilling exhibit the characteristic undulations of bacon yet possess a substantially lower fat content.

A still further object of the present invention is to provide a new and improved process for producing an integrated meat product of the type described which obviates the need for the formation of a surface exudate and at the same time provides a degree of flexibility within the process that permits storage at different stages of manufacture of the meat product.

Other objects will be in part obvious and in part pointed out in more detail hereinafter.

These and related objects are accomplished in accordance with the present invention by providing a composite pasteurized meat product comprised of a mixture of untrimmed, uncooked meat pieces having a fat content of less than about 75% by weight secured in an integral, internally knitted, bound and coalesced form by a binder comprised of a curing agent and ground meat particles blended into and absorbed within a solid unified mass or body of meat and which on slicing has a texture color and general appearance similar to a primal meat cut and is characterized by an integrated boundary between abutting pieces of meat as well as between its meat and fat areas. It is a benefit of the present invention that the binding agent includes both binding and curing agents yet is not visably noticeable in the finished product since it is at least partially absorbed by the meat pieces and effecting the fused integral appearance of the desired final product which does not separate upon handling or slicing. Advantageously, the product is produced by a technique that permits its processing into a form similar to that of bacon with all the attendant beneficial characteristics thereof yet with a reduced fat content. This technique involves the steps of providing small untrimmed pieces of economical beef cuts which are blended with an appropriate binding agent and compressed into an appropriate form. The binding agent consists of a suitable curing material which is fully and intimately blended with appropriate quantities of ground lean beef to a fine sticky consistency and is then mixed with the small untrimmed pieces of beef prior to being stuffed into a moisture impermeable casing for molding into the desired form. The molded material is cured under refrigeration for a period of about 16 hours or more followed by an appropriately controlled pasteurizing and knitting treatment prior to storage and packaging.

A better understanding of the objects, advantages, features, properties and relationships of the invention will be obtained from the following detailed description and accompanying drawing which set forth an illustrative embodiment and are indicative of the way in which the principles of the invention are employed.

A BRIEF DESCRIPTION OF THE DRAWING

Figure 2:
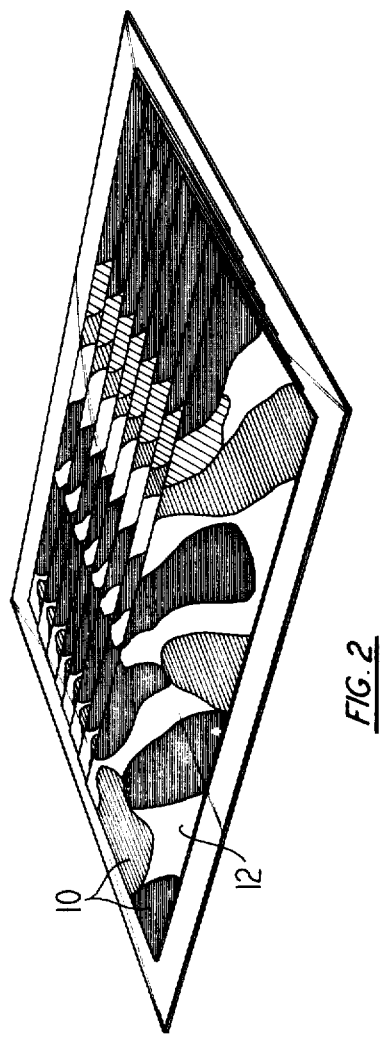

In the drawing:

FIG. 1 is a flow diagram generally indicating the process steps utilized in accordance with the present invention; and FIG. 2 is a perspective view illustrating the sliced and packaged product in accordance with the present invention.

A DESCRIPTION OF A PREFERRED EMBODIMENT

Referring now to the drawing in greater detail, the process of the present invention is shown as consisting of the initial steps of preparing and admixing the untrimmed meat cuts with the binder composition. The meat cuts are preferably small pieces of an economical grade red meat from animals such as beef, pork, veal and the like. The small pieces of meat are used in their untrimmed condition without removal of the fat adhered thereto. These pieces, which are only about 1 to 2 ounces in size should be distinguished from large cuts or chunks of lean primal beef. Preferably, the meat pieces are those cuts of beef obtained from the thin underportion of the animal such as the plate, flank or ribs including the short ribs. Although these pieces may have a fat content of about 55% or more and are considered to be the more economical cuts of beef, the quality may be of U.S. Grade Good, Choice, Prime or other comparable quality depending on the desired end product. These small untrimmed but boned pieces of beef are preferably cut to the requisite 1 to 2 ounce size and can be stored under refrigerated conditions until mixed with the binder composition. However, unlike prior exudate bonding techniques they should not be in a frozen condition at the time they are mixed with the binder but should be at a cooled or chilled temperature of about 35°–45°F. and preferably about 38°–42°F. in order to permit the binder to permeate through these small pieces and effect the desired curing and binding action.

As illustrated, the binder used in accordance with the present invention consists of two essential components, a curing agent and an appropriate quantity of ground lean beef. Although the actual composition of the curing agent can vary to suit the taste required in the final product, the curing agent is preferably an aqueous saline or brine solution of the type mentioned in my U.S. Pat. No. 3,663,233. In addition to its major salt or sodium chloride component it contains an appropriate amount of sugar, meat phosphates, sodium nitrates and nitrites, hydrolized plant protein and the like.

The other major component of the binder composition is ground lean meat that is used to adjust and control the fat content of the final product and to provide an appropriate integrating media for the small untrimmed pieces of beef. In this connection, the ground lean beef may constitute up to about 25% by weight of the total product and preferably is used in quantities of about 15–20% by weight. Since the added lean beef is finely ground, it can be obtained from substantially any portion of the carcass and may be of any desired quality. In accordance with the preferred embodiment, the meat is ground three or four times to a fine consistency while simultaneously blending the curing agent therewith until the final binder composition exhibits a pasty or sticky consistency. Prior to mixing the binder with the small pieces of untrimmed beef, it should be cooled to a temperature approximately 10°–20°F. below the temperature of the untrimmed beef pieces to promote and enhance the coating of the binder on all surfaces of the untrimmed beef pieces during the brief mixing operation. The mixing is carried out by conventional techniques and involves simply mixing the untrimmed beef with the binding agent for a period of about 3 to 4 minutes or such additional time as is required to expose all surfaces of the small untrimmed pieces of beef to the pasty sticky binding material.

After the mixing operation, the blended beef and binder is placed within a suitable moisture impermeable casing of appropriate size and shape and is then molded into the desired form. The encased molded material is then refrigerated at about 35°–45°F. for a curing period of about 16 hours or more.

As will be appreciated from the foregoing brief description, the process of the present invention provides for rapid preparation, blending and molding of the beef product in its initial form prior to a curing period under storage. This eliminates the necessity for any precuring or precooking of the initial ingredients yet provides for rapid and easy compounding and control over the lean and/or fat content therein. Advantageously, the curing period can be extended well beyond the minimum 16 hours mentioned hereinabove without adversely affecting the product and, in view of its premolded condition it is well suited to the subsequent heating operations.

The heating is advantageously conducted in three steps; namely, conditioning, coalescing and sterilizing or pasteurizing operations. In the conditioning operation the molded product is placed within a heating tank with the water therein maintained at a temperature of about 108°–115°F. and preferably at about 110°–112°F. for a period of about 1 hour. This conditioning period is essential in order to retain and maintain the appropriate color within the final product and at the same time subject the product to an initial peripheral or surface stabilizing operation. The conditioning operation is believed to be primarily a surface conditioning phenomenon in preparation for the subsequent coalescing and pasteurizing of the interior of the product.

Following the conditioning period, the water temperature of the heating tank is increased by about 10° or so to about 117°–125°F. and preferably to about 120°–122°F. and maintained at this temperature for a prolonged period of about 3 to 3½ hours followed by a subsequent increase in water temperature sufficient to raising the internal temperature of the product to about 135°F. The sterilized or pasteurized meat product is then cooled slowly to a temperature of about 95°–100°F. prior to being stored under refrigeration. The cooled product then can be sliced and packaged for distribution. For example, a two inch thick slab of the meat product can easily be cut or sliced in a bacon slicing machine following which it can be portion controlled and vacuum packed to produce a package such as that illustrated in FIG. 2. As will be appreciated, the slicing and packaging operations can be omitted, if desired.

Referring now to FIG. 2 of the drawing the resultant meat product is illustrated in a sliced and packaged form similar to that conventionally associated with sliced bacon. Each slice of the meat product consists of a plurality of discrete meat areas 10 randomly interspersed and integrally bonded to each other and to discrete areas of fat 12, with all areas in the meat product having discernable boundaries which appears to be fused or integrally blended, knitted or bonded to adjacent areas of either additional meat portions or fat portions in a manner similar to that exhibited in the natural texture of primal cuts of meat. This pasteurized or sterilized meat product while exhibiting many of the characteristics of bacon, advantageously possesses a controlled quantity of lean meat and the total fat content of the meat product is well below that normally associated with bacon and is in fact well below a 75% fat content and preferably below a 50% by weight fat content.

The present invention preferably utilizes beef as the primary source of meat. However, various types and sources of red meat also can be advantageously employed. For example, excellent results have been obtained when the beef is replaced by suitable cuts of pork. Additionally, other sources of meat such as veal, mutton, lamb, venison, etc. may also be utilized, although for practical purposes, the principal commercial types of meat used in this country are preferred and the invention will be illustrated primarily in connection with the use of beef.

In practicing the invention the untrimmed meat pieces forming the major portion of the meat product are generally boned fresh meat of the more economical cuts. In this connection fresh meats are generally considered to be the meat resulting from a recently slaughtered animal, usually refrigerated or chilled under normal conditions. Additionally, the more economical cuts from the underside of the quality grade animals can be advantageously used. However, as mentioned hereinbefore it is particularly important in the present invention that these untrimmed meat pieces not be in a frozen condition at the time of blending or mixing with the bonding composition. Thus, the boned untrimmed pieces of meat cut from the plate, flank or rib of the carcass together with other economical beef cuts of the desired quality can be used and should be used at a temperature below about 50°F. and preferably at a temperature of approximately 38°–42°F. for best results. Such meat cuts generally have a lean content greater than 35% by weight and frequently average about 40–50% by weight lean meat. Thus, boned but untrimmed pieces having an average lean content of about 45% are generally used.

The meat is cut into small 1 to 2 ounce pieces either by hand or by some appropriate machinery prior to the mixing operation. It is also essential that the pieces be of this small size and not exceed about 4 ounces or more in order to provide adequate surface area for coating by the binding agent, thus avoiding excessive bulk into which the curing agent must permeate. Accordingly, chunks of beef having a size of about one half pound or more are not well suited to the process of the present and generally are further cut to the smaller one to two ounce preferred size in order to take advantage of the process features of the present invention.

The particular curing agent employed will vary somewhat in order to provide the appropriate taste in the resultant product. As mentioned, the curing agent is of a conventional composition and is used in proportion to the meat pieces in an amount within the range of about 1:6 to 1:15 and preferably about 1:10. Thus for each 100 pounds of meat pieces it is preferred that about 10 pounds of curing agent be used. Since the curing agent is fully incorporated into the bacon product, the specific amount thereof employed will have a definite effect on the taste of the product.

Many modifications of the basic meat curing art are well known and generally the salt or brine curing agent or mix is formulated by incorporating such additives as sugar, sodium nitrites and nitrates, meat phosphates, monosodium glutamate, hydrolized plant protein and the like. Although some curing compositions have been applied in dry form to the surface of the meat, the use of aqueous salt solutions is preferred in accordance with the present invention. An aqueous curing agent, after being appropriately prepared is then admixed with lean ground beef to provide a paste-like or sticky binding composition. A typical example of a curing agent formulation found useful in the present invention for use with 100 pounds of beef is as follows:

| Water | 6 pounds |
| Salt | 2 pounds |
| Sugar | 8 ounces |
| Meat phosphates | 8 ounces |
| Prague powder | 4 ounces |
| Monosodium glutamate | 2 ounces |
| Hydrolized plant protein | 2 ounces |

The meat phosphates utilized in accordance with the teaching of the present invention include the conventional meat phosphates utilized in the industry such as sodium tripolyphosphate, sodium pyrophosphate, sodium hexametaphosphate and the like. These alkaline phosphates have become widely used as curing agents both alone and in combination with salt and the alkaline nitrates and nitrites (listed above as Prague powder). As is shown, sodium nitrite and/or sodium nitrate is used to produce the desired pink coloration in the cured product.

The aqueous brine curing agent is admixed with a portion of lean ground meat in order to provide the requisite binder of sticky consistency. Generally, the ground beef constitutes up to about 25% of the total meat product and is preferably lean meat of lower quality than the untrimmed pieces used as the primary components of the meat product. The preferred amount of ground lean meat employed is in the range of about 15% to 20%. As will be appreciated, this amount can be varied in order to appropriately control the lean and fat content of the final product.

The ground lean meat can be obtained from any part of the carcass and may be of any quality meat, even of commercial grades. The meat is preferably ground three or four times to give it the appropriate fine consistency and the curing agent is added thereto during the grinding operation so that upon completion of the grinding, intermixing and blending with the curing agent the resultant binder material exhibits a pasty or sticky consistency. Thereafter, upon mixing with the untrimmed meat pieces it will adhere to the surfaces thereof and provide an appropriate coating thereon.

It is an advantage of the present invention that slight modifications of the product can be easily accomplished. For example, when it is desirable to produce a product having a smoked taste and aroma, a portion of the ground lean meat may be replaced with the appropriate amount of strongly smoked ground meat at the time the binder is formulated. Generally, smoked meat comprising about 3 to 4 percent of the total product will be sufficient to impart the requisite smoked effect. Additionally, other ingredients such as powdered pastrami spices may be added to the curing and binding composition to appropriately adjust the taste of the product. That is, the binder composition should be cooled to a temperature that is about 5°–25°F. lower and preferably about 15°F. lower than the temperature of the meat pieces to which it is added prior to admixing therewith. This can be radily accomplished by precooling the brine curing agent prior to blending with the ground lean meat so that it is at a temperature of about 20°F. yet is still fluid. The addition of the ground lean meat will tend to raise the temperature somewhat so that the binder composition will have a temperature between about 20°F. and 30°F. at the time it is admixed with the small cut or sliced pieces of untrimmed beef. Thereupon as it is blended with these meat pieces it will tend to adhere to the warmer surfaces thereof and assure a thin coating thereon in preparation for the subsequent curing and heating operations.

Following the mixing procedure the combined uncooked meat pieces and binder is tightly packed into a suitable casing and is compacted therein prior to the shaping or molding operation. The casing should be of a moisture impermeable type and preferably takes the form of a flexible plastic envelope of an appropriate size to provide the desired shape after it has been placed in the molding form. The plastic casing may be polyethlene, vinylidene chloride copolymer, pliofilm or similar materials. The size of the casing will depend on the size of the product desired. For example, a casing having a diameter of about 6 inches is suitable for producing a block or slab of meat product having a generally rectangular configuration and measuring approximately 16 × 7 × 4 inches.

After the material has been placed in the mold it is allowed to stand under refrigeration at a temperature of about 35°–45°F. and preferably at about 38°–42°F. for a period of at least 14 to 16 hours and preferably 16 hours or more. Thus, the compacted or molded meat product may be kept under refrigeration in this condition for about 1 to 2 days in order to provide sufficient time for penetration of the curing agent through the individual small untrimmed and uncooked meat pieces on which it is coated. As will be appreciated, substantially larger pieces than the desired 1 to 2 ounce size would require a longer period of time in order to provide the desired curing action. The preferred smaller pieces not only cure faster but also provide added surface area which is coated by curing agent thus facilitating a more rapid cure of the meat pieces and a greater amount of curing agent coated on the respective pieces. It will also be appreciated that the curing period is substantially equal to the conventional lapse of time between work days; that is, the product could be placed under refrigeration during one working day and would be fully cured and ready for the heat processing operation on the following day. This is particularly advantageous since it would provide for substantially no lost time in the processing of the products. Additionally, since the product is refrigerated during the curing operation it can be permitted to stand for periods longer than 16 hours such as over a weekend period without adversely effecting the product's quality or characteristics.

The cured product is then subjected to incremental heat processing that involves an initial product conditioning operation which preferentially takes place at a temperature of about 108°–115°F. and preferably at about 110°F. for a period of about 1 hour. Thus, the cured product within the flexible plastic casing is placed within a heating tank or vat and kept at the requisite temperature for a sufficient length of time to provide a conditioning of the outside or skin portion of the product. This conditioning is also required to attain the desired pink coloration in the beef portions of the product. Additionally, the temperature assures that at the outside surface the meat product is sufficiently warm to prevent fat separation. Although the length of time of the conditioning operation may vary somewhat the temperature should be closely controlled at about the 110°–112°F. level.

Upon completion of the conditioning portion of the heating process, the temperature of the water is increased to approximately 117°–125°F. and preferably about 120°–122°F. and is held at this temperature for a period of about 3 to 3-½ hours or for a sufficient length of time to bring the internal temperature of the meat product up to at least the 110°–112°F. level where the binder will start to blend into the pieces on which it is coated. Preferably, the internal temperature will be brought close to 120°F. so as to destroy unwanted bacteria or other micro-organisms while simultaneously accelerating the curing action. As taught in my aforementioned U.S. Pat. No. 3,663,233 this temperature is favorable to an enzymatic reaction that weakens the connective tissue between the meat fibers while inhibiting and even destroying bacteria. However, in accordance with this invention it is not necessary to use the 9 to 10 hour tenderizing period described in that earlier patent.

Subsequently, the temperature of the tank is increased to approximately 160°–162°F. and kept at that temperature until the internal temperature of the meat product reaches about 135°F. Since this temperature is below the 148°F. temperature normally considered as required for a cooked product, the resultant product can be generally considered as a cured precooked material.

In that instance where a pastrami product is desired and pastrami spices in powdered form have been added to the curing agent, it is generally preferred to raise the heating temperature to 164°–166°F. and raise the internal temperature of the product to about 160°F. thereby cooking the beef. Subsequently, after cooling, additional spice is preferably applied to the outer surface of the product.

The processed meat is next cooled with water to a temperature of about 95°–100°F. and is then placed in storage under refrigeration. Subsequently, or as soon as the material has cooled to about 32°–34°F. it can be sliced to an appropriate size and thickness. Advantageously, the resultant product exhibits the texture, color and general appearance of primal beef cuts as well as a uniformity of moisture distribution and a unified character having excellent slicing qualities. Additionally, it can be fried, broiled or grilled in a shorter time than bacon while exhibiting substantially the same appearance.

As will be apparent to persons skilled in the art, various modifications, adaptations and variations of the foregoing specific disclosure can be made without departing from the teachings of the present invention.

I claim:

1. A process for producing a composite bacon-like meat product of reduced fat content comprising the steps of providing small untrimmed pieces of economical meat cuts, said meat pieces being in an unfrozen condition; forming a binder for the meat pieces by blending an aqueous brine curing solution with about an equal amount by weight of ground meat to form a binder composition having a sticky paste-like consistency; cooling the binder to a temperature at least 10°F. below the temperature of the untrimmed meat pieces and intimately mixing the relatively cooler binder with the relatively warmer small meat pieces to coat the surfaces of the meat pieces with the binder; encasing the binder-untrimmed meat mixture and maintaining the encased mixture under refrigeration for a curing period of at least about 14 to 16 hours; and subsequently incrementally heating the encased cured mixture without dehydration to a surface conditioning temperature of at least about 108°F. followed by heating to a temperature of about 117°–125°F and subsequently to an internal temperature of about 135°F.

2. The process of claim 1 wherein the binderuntrimmed meat mixture is encased within a moisture impermeable casing and molded into a desired shape prior to being refrigerated for the curing period.

3. The process of claim 1 wherein the small untrimmed pieces are of about 1–2 ounce size and have a lean meat content of about 40–50 % by weight and the curing solution is a brine containing meat phosphates and alkaline metal nitrates and nitrites.

4. The process of claim 1 wherein the untrimmed meat is at a temperature of about 35°–45°F prior to admixture with the binder and the binder is at a temperature about 10°–20°F below the temperature of the meat at the time of admixture therewith.

5. The process of claim 1 wherein the incremental heating includes heating the surface conditioned material at a temperature of about 120°–122°F for at least about 3 hours.

6. The process of claim 1 including the steps of cooling the incrementally heated product and slicing and packaging the cooled product.

7. The process of claim 6 wherein the product is sliced into thin strips suited for use as a substitute for bacon.

* * * * *